US009031568B2

(12) United States Patent
Karaoguz et al.

(10) Patent No.: US 9,031,568 B2
(45) Date of Patent: May 12, 2015

(54) QUALITY-OF-SERVICE (QOS)-BASED ASSOCIATION WITH A NEW NETWORK USING BACKGROUND NETWORK SCANNING

(75) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2324 days.

(21) Appl. No.: 11/094,048

(22) Filed: Mar. 30, 2005

(65) Prior Publication Data
US 2006/0025149 A1 Feb. 2, 2006

Related U.S. Application Data

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.
H04W 72/00 (2009.01)
H04W 28/24 (2009.01)
H04N 21/41 (2011.01)
H04W 36/26 (2009.01)
H04W 36/28 (2009.01)

(52) U.S. Cl.
CPC ........... *H04W 28/24* (2013.01); *H04N 21/4126* (2013.01); *H04W 36/26* (2013.01); *H04W 36/28* (2013.01)

(58) Field of Classification Search
CPC . H04N 21/4126; H04W 36/28; H04W 28/24; H04W 36/26
USPC ................. 455/452.2, 558, 455; 370/280
See application file for complete search history.

(56) References Cited

U.S. PATENT DOCUMENTS 5,557,320 A * 9/1996 Krebs ................ 725/114
5,598,459 A * 1/1997 Haartsen ................ 455/411

(Continued)

FOREIGN PATENT DOCUMENTS

WO WO 0211485 A2 * 2/2002

*Primary Examiner* — Kamran Afshar
*Assistant Examiner* — Gary Lafontant
(74) *Attorney, Agent, or Firm* — Brinks Gilson & Lione

(57) ABSTRACT

A method and device support the use of background network scanning to enable association with a first and at least a second wireless network, for the exchange of exchange of multimedia information. Representative embodiments of the present invention may sniff radio frequency spectrum and determine at least one characteristic of detected wireless networks having capacity for exchange of the multimedia information. More than one wireless network may be identified for use in exchanging the multimedia information, which may be communicated concurrently over the identified wireless networks. User defined criteria may be employed in adjusting communication of the multimedia information to meet a quality of service level desired by a user. A lack of wireless network capacity may result in adjustments to, for example, protocols used to represent multimedia information, frame rate, and spatial or color resolution, in order to maintain or enable communication.

26 Claims, 8 Drawing Sheets

(56) References Cited

U.S. PATENT DOCUMENTS

| | | | | |
|---|---|---|---|---|
| 5,644,715 | A * | 7/1997 | Baugher | 709/228 |
| 6,049,549 | A * | 4/2000 | Ganz et al. | 370/449 |
| 6,201,971 | B1 * | 3/2001 | Purnadi et al. | 455/450 |
| 6,223,042 | B1 * | 4/2001 | Raffel | 455/455 |
| 6,351,456 | B1 * | 2/2002 | Struhsaker et al. | 370/280 |
| 6,370,592 | B1 * | 4/2002 | Kumpf | 719/328 |
| 6,453,336 | B1 * | 9/2002 | Beyda et al. | 709/204 |
| 6,456,849 | B1 * | 9/2002 | Purnadi et al. | 455/453 |
| 6,556,824 | B1 * | 4/2003 | Purnadi et al. | 455/442 |
| 6,704,576 | B1 * | 3/2004 | Brachman et al. | 455/503 |
| 6,760,308 | B1 * | 7/2004 | Ghanma et al. | 370/235 |
| 6,785,280 | B1 * | 8/2004 | Tovander | 370/395.1 |
| 6,816,730 | B2 * | 11/2004 | Davies et al. | 455/436 |
| 6,931,460 | B2 * | 8/2005 | Barrett | 710/57 |
| 6,950,655 | B2 * | 9/2005 | Hunkeler | 455/426.1 |
| 6,970,422 | B1 * | 11/2005 | Ho et al. | 370/230 |
| 6,982,949 | B2 * | 1/2006 | Guo et al. | 370/210 |
| 7,006,828 | B1 * | 2/2006 | Czaja et al. | 455/442 |
| 7,065,353 | B1 * | 6/2006 | Bolinth et al. | 455/426.1 |
| 7,120,460 | B2 * | 10/2006 | Shaheen et al. | 455/552.1 |
| 7,260,079 | B1 * | 8/2007 | Chapman et al. | 370/338 |
| 7,738,871 | B2 * | 6/2010 | Olvera-Hernandez et al. | 455/436 |
| 7,742,766 | B2 * | 6/2010 | Liu et al. | 455/436 |
| 7,797,437 | B2 * | 9/2010 | Hovmark et al. | 709/230 |
| 7,822,438 | B2 * | 10/2010 | Parron et al. | 455/552.1 |
| 7,924,785 | B2 * | 4/2011 | Shaheen et al. | 370/331 |
| 8,000,298 | B2 * | 8/2011 | Tsutsumi et al. | 370/331 |
| 8,014,367 | B2 * | 9/2011 | Carlton et al. | 370/338 |
| 8,023,473 | B2 * | 9/2011 | Sim | 370/336 |
| 8,059,601 | B2 * | 11/2011 | Choi et al. | 370/331 |
| 8,219,091 | B2 * | 7/2012 | Olvera-Hernandez et al. | 455/436 |
| 8,233,455 | B2 * | 7/2012 | Shaheen et al. | 370/331 |
| 8,238,261 | B2 * | 8/2012 | Olvera-Hernandez et al. | 370/252 |
| 8,712,423 | B1 * | 4/2014 | Oksala et al. | 455/452.2 |
| 2003/0060221 | A1 * | 3/2003 | Eberlein et al. | 455/503 |
| 2004/0063426 | A1 * | 4/2004 | Hunkeler | 455/426.1 |
| 2004/0180661 | A1 * | 9/2004 | Chen et al. | 455/436 |
| 2004/0218564 | A1 * | 11/2004 | Henrikson | 370/331 |
| 2004/0246923 | A1 * | 12/2004 | Achard | 370/331 |
| 2005/0031047 | A1 * | 2/2005 | Maltsev et al. | 375/260 |
| 2005/0032514 | A1 * | 2/2005 | Sadri et al. | 455/423 |
| 2005/0059397 | A1 * | 3/2005 | Zhao | 455/435.2 |
| 2005/0090277 | A1 * | 4/2005 | Islam et al. | 455/525 |
| 2005/0190747 | A1 * | 9/2005 | Sindhwani et al. | 370/352 |
| 2005/0282490 | A1 * | 12/2005 | Nurmi | 455/11.1 |
| 2006/0099956 | A1 * | 5/2006 | Harada et al. | 455/452.2 |
| 2007/0171869 | A1 * | 7/2007 | Salkintzis | 370/331 |

* cited by examiner

QUALITY-OF-SERVICE (QOS)-BASED ASSOCIATION WITH A NEW NETWORK USING BACKGROUND NETWORK SCANNING

RELATED APPLICATIONS

The present application makes reference to, claims priority to, and claims the benefit of the following United States Provisional patent applications, the complete subject matter of each of which is hereby incorporated herein by reference, in its entirety.

| Serial No. | Attorney Docket No. | Title | Date Filed |
| --- | --- | --- | --- |
| 60/591,735 | 15884US01 BP3837 | Method and System for Handoff Through Simulcasting | Jul. 28, 2004 |
| 60/591,847 | 15885US01 BP3838 | Method and System for Handling Calls Through Simulcasting | Jul. 28, 2004 |
| 60/591,844 | 15886US01 BP3839 | Method and System for Handling Multimedia Information Through Simulcasting | Jul. 28, 2004 |
| 60/591,841 | 15887US01 BP3840 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | 15888US01 BP3841 | Method and System for Consuming Simulcasted and Multicasted Content in a PAN/WAN/WLAN Serviced by a Broadband Access Gateway | Jul. 28, 2004 |
| 60/591,843 | 15889US01 BP3842 | Method and System for Handoff of a Multimedia Stream by Sniffing | Jul. 28, 2004 |
| 60/591,842 | 15890US01 BP3843 | Method and System for Sniffing to Provide Association with a New Network | Jul. 28, 2004 |

The present application also makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/094,045, entitled "Handling Of Multimedia Call Sessions And Attachments Using Multi-Network Simulcasting", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

As users of wireless communication devices move about, the quality of the wireless communication path may change drastically. In some cases, conditions degrade to the point that the wireless communication path is dropped, when the wireless access device or the network determines that satisfactory communication is no longer possible. The decision to end the call is normally made without user input, and is generally based upon criteria determined by the maker of the wireless access device and/or the network infrastructure equipment. Although their current wireless network may be impaired, users of wireless access devices may migrate within the coverage areas of a number of other wireless networks without knowing of their existence.

In other circumstances, a user may be aware of the existence of the other wireless networks, and may take advantage of such networks when in a geographic location served by a known wireless network. Many more wireless networks may exist than those of which the user is aware, and the user of a wireless access device may therefore be unaware of the opportunity to make use of those other networks for communication. Some of the available networks may be suitable for the communication activities of a particular access device user, while others may not. In addition, wireless service providers are continually adding new network capabilities and features, and new wireless service providers enter the market each day. Depending upon the number of active subscribers and/or users, and the activities of each subscriber and/or user, a wireless network that one day provides satisfactory quality of service may, on another day or at another time, be unable to meet a particular wireless access device user's needs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and device supporting quality of service based association with a new network using background network scanning, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to communication over hybrid wired and wireless networks. More specifically, certain embodiments of the present invention relate to a method and system for quality of service based association with a new network using background network scanning of a wireless network environment. In a representative embodiment of the present invention, scanning may comprise sniffing of radio frequency spectrum. A representative embodiment of the present invention allows a user of a wireless access device greater freedom of movement, and a wider variety of communication options than is available using conventional technology.

An aspect of the invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network. In a representative embodiment of the present invention, a user of a wireless access device engaged in a communication session may be kept aware of other wireless networks providing service at their present location, and may elect to make use of one of those other networks to continue their current communication activity.

Figure 1:
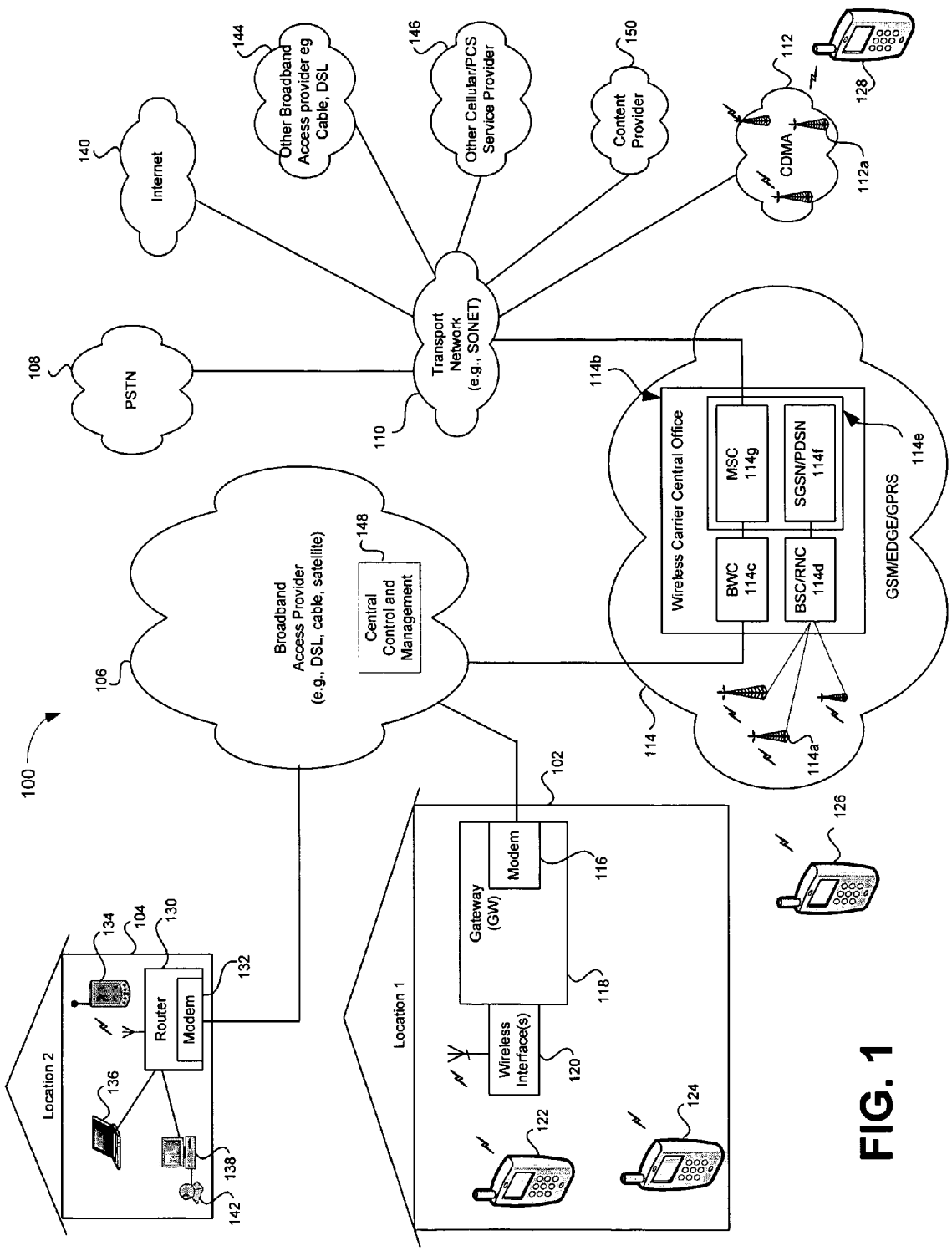
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM/EDGE/GPRS network 114 towards the wireless interface 120 in the first location 102, the call may be handed off from the cell site 114a of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114c.

In a representative embodiment of the present invention, a number of wireless performance prediction parameters (WPPP) or attributes may be employed during the operation of a communication network such as, for example, an Institute of Electrical and Electronics Engineers (IEEE) 802.11 communication network. These wireless link attributes may be exchanged by an infrastructure transceiver device such as, for example, a wireless access point (WAP) or a broadband access gateway such as the broadband access gateway 118, for example, and a mobile communication device such as the mobile access device 124, for example. Such an exchange of parameters or attributes may permit the endpoints of a wireless communication link in a representative embodiment of the present invention to decide, for example, whether to make adjustments to the current level of service being provided, or to switch from use of a first communication network to add or switch to a second communication network. The wireless performance prediction attributes used in such a decision may be based on a signal-to-noise ratio (SNR), a frame error rate, a fading characteristic of the communication link, and a measure of throughput, to name only a few examples. If the wireless performance prediction parameters or attributes indicate that the level of service offered by a current serving communication network is below an expected and/or acceptable level, then an access point or broadband access gateway of the network may, for example, decrease the bandwidth required of the communication link by, for example, decreasing the resolution of the multimedia information transferred to the serviced mobile access device such as the mobile access device 124, for example. A user of the mobile access device, however, may not be satisfied with a reduced resolution, that may not meet the quality of service (QoS) expectations of the user. Accordingly, in a representative embodiment of the present invention, a user of a mobile access device may be offered an option to purchase additional bandwidth to attain the expected and/or acceptable level of service. Given this option, the user of the mobile access device may opt to pay the cost for the additional bandwidth.

In another representative embodiment of the present invention, an access device may determine the QoS that is being received from its serving communication network based on these wireless performance prediction parameters, and may compare the QoS currently being provided, with the QoS that a newly detected or "sniffed" communication network may be able to provide. During operation, the wireless access device may observe and analyze (sniff) portions of the radio frequency spectrum for which it is equipped, and may derive wireless performance prediction parameters with the sniffed network(s). If the wireless performance prediction parameters indicate that the newly sniffed communication network may provide a better QoS than the current serving communication network, the mobile access device may switch from the current serving communication network to the newly sniffed communication network. However, if the wireless performance prediction parameters indicate that the newly sniffed communication network would provide a lower QoS than the current serving communication network, then the access device may not initiate a switch from the current serving communication network to the newly sniffed communication network. In this regard, the mobile access device may continue receiving service from the current servicing communication network and may also continue scanning and/or sniffing to locate other compatible networks. The decision to switch between wireless communication networks may be initiated in hardware (e.g., in a hardware circuit such as an integrated circuit) or it may be initiated from an application layer by software or firmware.

In yet another representative embodiment of the present invention, based on the wireless performance prediction parameters, a decision may be made by the mobile access device to communicate using multiple wireless networks. In one representative embodiment of the present invention, the mobile access device may repeatedly bounce or switch between two or more wireless communication networks, in order to maintain at least a minimal level of service. In some representative embodiments, this minimal level of service may allow, for example, short message service (SMS) communication or other communications modes operating at lower bit rates and involving reduced levels of call processing. Any communication that required bandwidth beyond a specified threshold such as, for example, multimedia communication, may be prohibited or restricted. Accordingly, as a mobile access device such as, for example, the mobile access device 124 of FIG. 1 moves from one location to another, and the signal quality for the serving and neighboring communication networks repeatedly degrades and improves, a representative embodiment of the present invention may reduce the QoS level of communication rather than ceasing communication altogether, in order to provide this minimal amount of communication. In a representative embodiment in accordance with the present invention, the decision to bounce or keep switching between communication networks may be initiated in silicon (e.g., within integrated circuit device(s)) or it may be initiated from the application layer such as in software and/or firmware, for example.

In a representative embodiment of the present invention, at least a portion of the multimedia information within the received signal may be cached or temporarily stored, whenever the signal degrades. This may occur during periods when a mobile access device such as mobile access device 124, for example, is bouncing between two or more networks. The behavior of bouncing or switching between networks may take into consideration the type of multimedia information being exchanged. In accordance with a representative embodiment of the present invention, hysteresis may be added so as to prevent or otherwise limit a manner in which bouncing between communication networks occurs. For example, if a multimedia information stream comprising synchronization information such as, for example, a Moving Picture Experts Group (MPEG) data stream is being received, hysteresis may be employed to prevent bouncing every time an I-frame (a.k.a., I-picture) or other synchronization frame is received.

Figure 2:
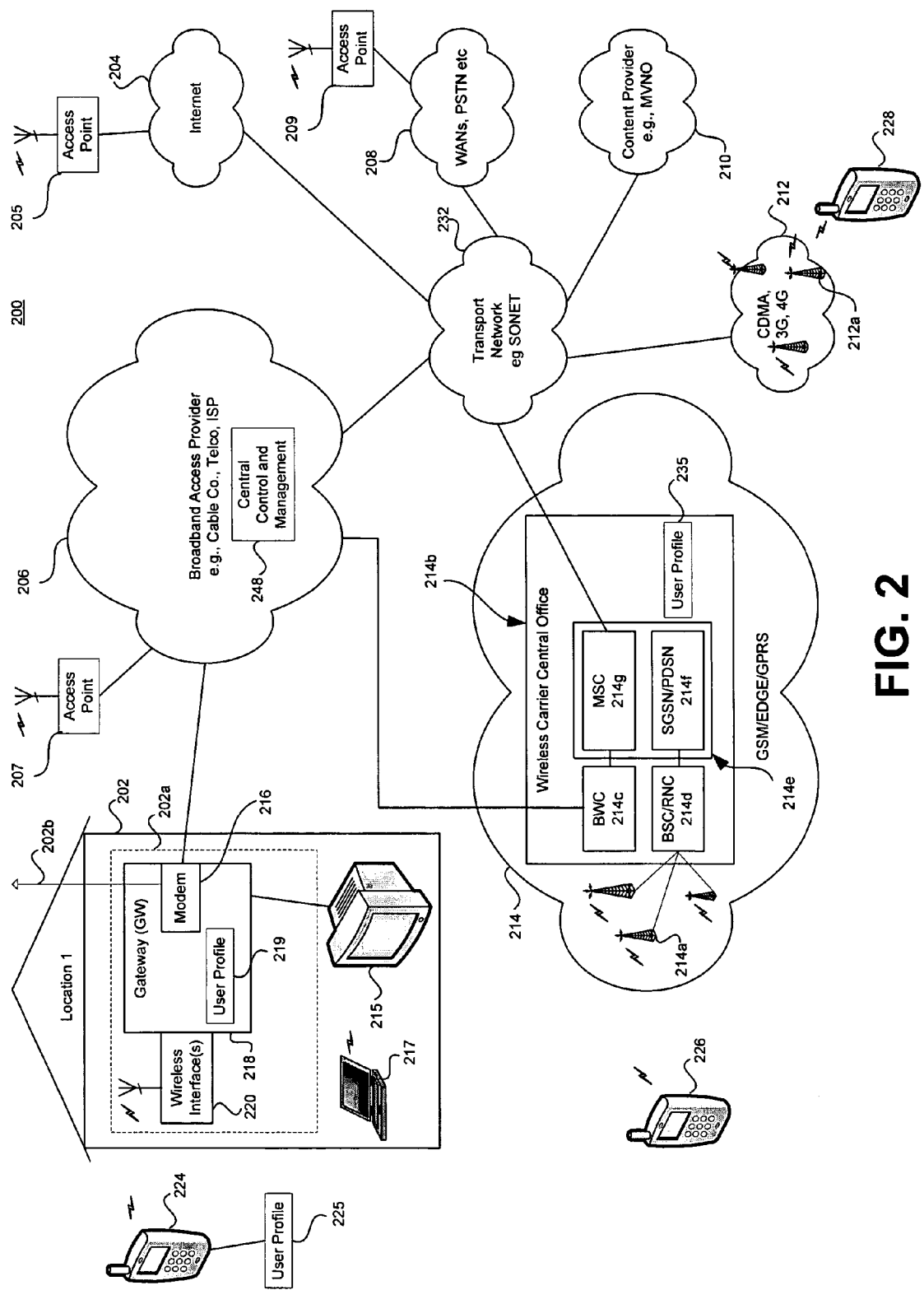
FIG. 2 shows a block diagram illustrating an exemplary communication system that may be utilized for quality of service based association with a new network using background network scanning of radio frequency spectrum in, for example, a broadband wireless local area network (WLAN) or personal area network (PAN), in accordance with a representative embodiment of the present invention.

FIG. 2 shows a block diagram illustrating an exemplary communication system 200 that may be utilized for quality of service based association with a new network using background network scanning of radio frequency spectrum in, for example, a broadband wireless local area network (WLAN) or personal area network (PAN), in accordance with a representative embodiment of the present invention. The exemplary communication system 200 of FIG. 2 may provide handoff through scanning for wireless network traffic, for an active subscriber, from a wireless service provider servicing the active subscriber to a broadband wired and/or a wireless LAN (WLAN), and/or PAN using a broadband access gateway. In a representative embodiment of the present invention, scanning may comprise sniffing of radio frequency spectrum. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, access points 205, 207, 209, and a plurality of mobile access devices 224, 226, 228. The illustration of FIG. 2 also comprises a central control and management block 248 that may correspond, for example, to the central control and management block 148 of FIG. 1.

The first location 202 comprises a broadband access gateway 218 with a modem 216, a wireless interface 220, and a user profile 219. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11a, b, g and/or n interfaces. In a representative embodiment of the present invention, the broadband access gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the broadband access gateway 218 via the cable modem 216, which is coupled to the broadband access provider 206. The wireless interface 220, the gateway 218 with modem 216, the BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25 GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electrical and Electronics Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network, or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise, for example, one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to the mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell sites and a wireless carrier central office 214b, the latter of which may comprise a mobile switching center (MSC) 214g. Cell site 214a may provide cellular service to mobile access device 226 while the mobile access device 226 is within range of the cell site 214a.

Referring to FIG. 2, based on wireless performance prediction parameters, a mobile access device such as, for example, the mobile access device 226 may, for example, determine the QoS that is being received from a serving communication network such as the GSM/EDGE/GPRS network 214, for example. In addition, the mobile access device 226 may sniff one or more portions of the radio frequency (RF) spectrum and may detect one or more other wireless communication networks. The mobile access device 226 may compare the current QoS with the QoS that a newly sniffed communication network such as, for example, the broadband access gateway 218 with wireless interface 220 might provide. The newly sniffed network may correspond to the home LAN 202a, for example. If wireless performance prediction parameters such as, for example, signal-to-noise ratio (SNR), fading characteristics (e.g., received signal strength), communication error rates, and/or throughput indicate that the newly sniffed communication network 202a would provide a better QoS than the current serving communication network 214, then the mobile access device 226 may elect to switch from the current serving communication network 214 to the newly sniffed communication network 202a. However, if the wireless performance prediction parameters indicate that the newly sniffed communication network 202a would provide a lower QoS level than the current serving communication network 214, then the mobile access device 226 may not initiate a switch from the current serving communication network to the newly sniffed communication network 202a. In this regard, the mobile access device 226 may continue receiving service from the current serving communication network 214 and also continue scanning to locate other compatible networks. The decision to switch between or among wireless communication networks may be initiated in silicon (i.e., by circuitry of the access device 226), or it may be initiated from the application layer.

In accordance with a representative embodiment of the present invention, the mobile access device 226, for example, may be currently receiving service via a first pathway from a wireless service provider such as, for example, the GSM/EDGE/GPRS network 214. Although this example refers to receiving service, the service may, for example, comprise either or both of receiving and sending of multimedia information. As the mobile access device 226 moves from network 214 towards network 202a, the mobile access device 226 may sniff a portion of radio frequency spectrum and may locate the second communication network 202a, which may be accessible by, for example, the broadband access gateway 218 of FIG. 2, a wireless access point such as access point 207, for example, or a hot spot. The wireless service provider (e.g., GSM/EDGE/GPRS network) 214 and the second communication network 202a may, for example, occupy separate portions of radio frequency spectrum and/or employ the same or incompatible communication protocols. In response to detecting the second communication network 202a, the mobile access device 226 may determine from various parameters and attributes of the signals of the second communication network 202a that the mobile access device 226 would be provided with service at a higher QoS level by the second communication network 202a, than that provided by the current serving network, the wireless service provider (e.g., GSM/EDGE/GPRS network) 214. Quality of service may comprise, for example, error rates, frame rates, spatial resolution, color depth, sample rates, levels of grey scale, bits per sample, network delays, and the like.

In one representative embodiment of the present invention, the mobile access device 226 and/or the current serving wireless network, for example, may determine that the service provided by the current serving wireless network (e.g., the GSM/EDGE/GPRS network 214) is unable to support the bandwidth needed for the exchange of multimedia information presently desired by the user of the mobile access device 226. Using information such as, for example, one or more of the wireless performance prediction parameters described above, the mobile access device 226 and/or the wireless network 214 may determine that communications conditions only adequately support the exchange of multimedia information of a lower resolution, bandwidth, or data rate. The term "lower resolution" is used herein to refer to, for example, digitized audio having fewer samples per second, fewer channels, or fewer bits per sample. In a similar fashion, the term may also be used to refer to digitized still image or video information having a lower spatial resolution, fewer frames per second, lower number of grey scale levels, and/or a reduced color depth. By reducing the resolution of the exchanged multimedia information, and hence the bandwidth or data rate needed for support, a representative embodiment of the present invention is capable of maintaining uninterrupted communication when encountering impairments of, for example, the air interface. In a representative embodiment of the present invention, a network entity such as, for example, the wireless carrier central office 214b, the broadband access gateway 218, the access point 207, and/or the mobile access device 226 may adjust, adapt, and/or modify the exchanged multimedia information for communication over an impaired wireless communication channel by changing the spatial resolution, number of grey scale levels, color depth, frame rate, number of channels, sample rate, bits per sample, for example. The selection of the form of modification may be based upon user-defined parameters, rules, guidelines, and limits that may be stored in a user-profile such as the user profiles 219, 225, 235 shown in FIG. 2. In one representative embodiment of the present invention, a user of an access device such as, for example, the mobile access device 226 may be notified of an automatic change in resolution of exchanged multimedia information. In another representative embodiment, the user may be prompted to select from options related to reducing the quality of service provided, or identifying the additional bandwidth needed to maintain communication at a level acceptable to the user.

In a representative embodiment of the present invention, a mobile access device such as mobile access device 226, for example, may determine that, due to changes in the air interface conditions, a desirable quality of service level cannot be maintained by a current serving wireless communication network such as the GSM/EDGE/GPRS network 214, for example. Examples of such air interface conditions may include high error rates caused by low signal levels or signal-to-noise ratio (SNR), and fading, to name only two. The mobile access device 226 may sniff radio frequency spectrum with which it is compatible, and may detect additional wireless communication networks such as the CDMA network 212, the local/personal area network supported by the broadband access gateway 218 with wireless interface 220, and the access point 207, for example. In such a representative embodiment, elements of the communication system 200 of FIG. 2 such as the wireless carrier central office 214b, the broadband access gateway 218, the access point 207, and the mobile access device 226, for example, may enable simulcasting of multimedia information, to provide multiple wireless communication paths. Although each of the individual paths may not support sufficient throughput to enable communication at a quality of service level acceptable to the user of the mobile access device 226, the combined capacity may allow communication at an acceptable QoS level. For example, in a representative embodiment of the present invention, an access device such as, for example, the mobile access device 226 may elect to establish communication paths with a number of detected wireless communication networks, and to "bounce" between service with the wireless communication networks in order to create an aggregate capacity that provides an acceptable quality of service to the user.

In one representative embodiment of the present invention, the user of the access device 226 may, for example, be notified and/or prompted regarding the establishment of the additional communication paths. Information about the cost of the additional paths may be provided, and the option to reduce quality of service or add communication paths may be provided to the user. Whether such establishment is automatic, and the conditions under which the paths are established and the user is notified and/or prompted may, for example, be based upon parameter, guideline, rule, and/or limit information residing in a user profile such as the user profiles 219, 225, 235 of FIG. 2.

During the periods when communication via a given path is available, the mobile access device 226, the broadband access gateway 218, the access point 207, and/or the GPS/EDGE/GPRS network 214, for example, may cache multimedia information to be used in minimizing disruption of the multimedia stream to the recipient. The amount of multimedia information may be beyond that normally used when communicating via a non-impaired over-the-air link. The mobile access device 226, the broadband access gateway 218, the access point 207, and/or the wireless communication network 214 may then assemble a properly sequenced, continuous stream of the multimedia information using the portions received via each of the multiple, simulcast paths. Sequencing information such as, for example, packet sequence numbers or time stamps assigned to each portion of multimedia information at the source may be used to reassemble a properly sequenced stream at the receiving location. This may enable the receipt via two or more paths of redundant streams of multimedia information packets, which may then be assembled into a continuous stream in which the redundant packets have been eliminated.

In a representative embodiment of the present invention, the bouncing between multiple wireless communication paths may be adjusted to be compatible with the form of multimedia information being exchanged. For example, some forms of multimedia information such as, for example, Moving Picture Experts Group (MPEG) video and audio streams contain reference frames (e.g., I-frames or I-pictures) that are normally used as anchor frames upon which the display of multiple other frames depend. Loss or corruption of such anchor frames may be expected to cause a greater degree of impairment in the exchange and consumption of such types of multimedia information, than the loss of other frames in the multimedia information stream (e.g., MPEG P or B-frames). In a representative embodiment of the present invention, the timing of bouncing between multiple wireless communication paths may be based, at least in part, upon the detection of such reference information or synchronization events in a stream of multimedia information. For example, any of the mobile access device 226, the broadband access gateway 218, the access point 207, and/or the GPS/EDGE/GPRS network 214 of FIG. 2 may analyze a multimedia information stream and may introduce hysteresis in the bouncing behavior of a representative embodiment of the present invention, based upon the detection of synchronization events such as those described above. By adjusting the points in time when bouncing between networks takes place, and the amount of multimedia information that is cached, the impact of an impaired over-the-air link may be minimized, and throughput may be maximized.

In a representative embodiment of the present invention, a mobile access device such as, for example, the mobile access device 226 of FIG. 2 may bounce between multiple wireless networks like the GSM/EDGE/GPRS network 214 and local area network of access point 207 of FIG. 2, for example. The bouncing may take into account the nature of the multimedia information being exchanged. In a representative embodiment of the present invention, the bandwidth available via each of the wireless networks may be different, and full redundancy of packet exchange via all available paths may not be used. As conditions improve on any path, more multimedia information may be exchanged via that path, while still maintaining other paths. During an exchange of MPEG encoded video, I-pictures that are used as anchor information in image prediction may be detected and specifically selected for exchange over the most reliable wireless network, since their loss or corruption may have significant and lasting effects on the displayed image. The bouncing between networks may also be restricted when such significant events are detected in the multimedia information stream, whether it be video, audio, or other digital information.

In another representative embodiment in accordance with the present invention, the mobile access device 226 may determine from wireless performance prediction parameters or attributes that certain modes or forms of multimedia communication cannot be supported, due to a lack of communication bandwidth. This determination may follow attempts to establish additional wireless communication paths, or an automatic or user decision not to establish the additional wireless communication paths involved in supporting multimedia communication. For example, a user of an access device such as, for example, the mobile access device 226 of FIG. 2 may migrate over the coverage area of a serving wireless service such as the GSM/EDGE/GPS network 214, and may enter an area in which network conditions do not support multimedia communication at a certain user-defined quality of service level (e.g., a particular spatial resolution, color depth, and frame rate). The user of the mobile access device wish to engage in a multimedia communication session, and additional communication paths may not be available and/or capable of providing the bandwidth needed to continue the current level of service. In a representative embodiment of the present invention, the user may be limited to certain forms of multimedia communication such as, for example, text communication. In other representative embodiments of the present invention, a network element such as, for example, the broadband access gateway 218 and/or the wireless carrier central office 214*b*, shown in FIG. 2, may adjust the encoding of the multimedia information to reduce the bandwidth that is required. For example, a broadband access gateway or wireless wide area network may transcode one information stream to form another of lower bit rate, or may convert a multimedia information stream from one encoding standard into another. A representative embodiment of the present invention may also strip higher bandwidth components such as, for example, a video stream, from a multimedia information stream also containing textual information, and may pass only the textual information, if conditions of the available wireless networks preclude the exchange at the higher bandwidth.

Figure 3A:
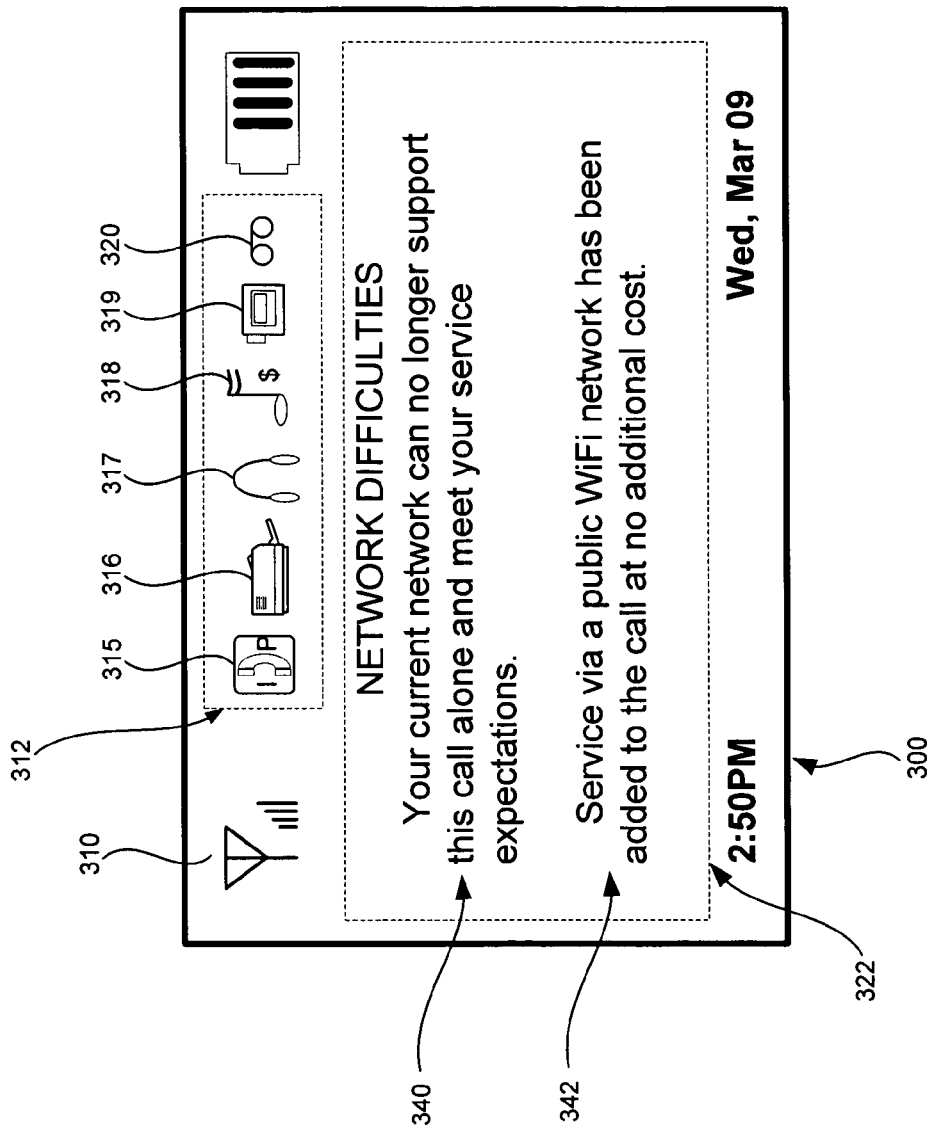
FIG. 3A shows an exemplary display of a wireless access device that may correspond to, for example, the wireless access device of FIG. 2 upon encountering wireless network impairments, in accordance with a representative embodiment of the present invention.

FIG. 3A shows an exemplary display 300 of a wireless access device that may correspond to, for example, the wireless access device 226 of FIG. 2 upon encountering wireless network impairments, in accordance with a representative embodiment of the present invention. The display 300 of FIG. 3A comprises a network indicator 310, a network services indicator area 312, a battery life indicator, a time of day indicator, and a day and date indicator. In addition, in the example of FIG. 3A, the network services indicator area 312 has been updated to comprise an Internet protocol (IP) phone service icon 315, a printer service icon 316, a stereo entertainment icon 317, a pay music service icon 318, a video entertainment icon 319, and a storage service icon 320 showing those services advertised by the wireless broadband access gateway as being available. The display 300 also comprises a display area 322 to allow an access device to present graphical or textual information for a variety of reasons and from a number of sources. In the illustration of FIG. 3A, the mobile access device has displayed information 340 indicating that the current network serving the call is unable to support the QoS desired by the user. This may occur when, for example, wireless network load, received signal strength, signal to noise ratio, or error rate is such that the wireless interface can no longer carry sufficient bandwidth to support the mode of communication (e.g., speech, still image, music, video). The display area 322 also comprises a notice 342 that an additional wireless network, in this example a WiFi (IEEE 802.11) network, has been found and added as a call path. In this case, the user is informed that the additional capacity is available via a no-cost (e.g., public) wireless network. The types of wireless networks that may be eligible for use may be defined by, for example, parameters, guidelines, rules, and/or limits stored in a user profile such as the user profiles 219, 225, 235 shown in FIG. 2. In the example of FIG. 3A, the additional network is joined to the call automatically, although in other representative embodiments the user may be prompted for a response indicating approval or selection of additional capacity.

Figure 3B:
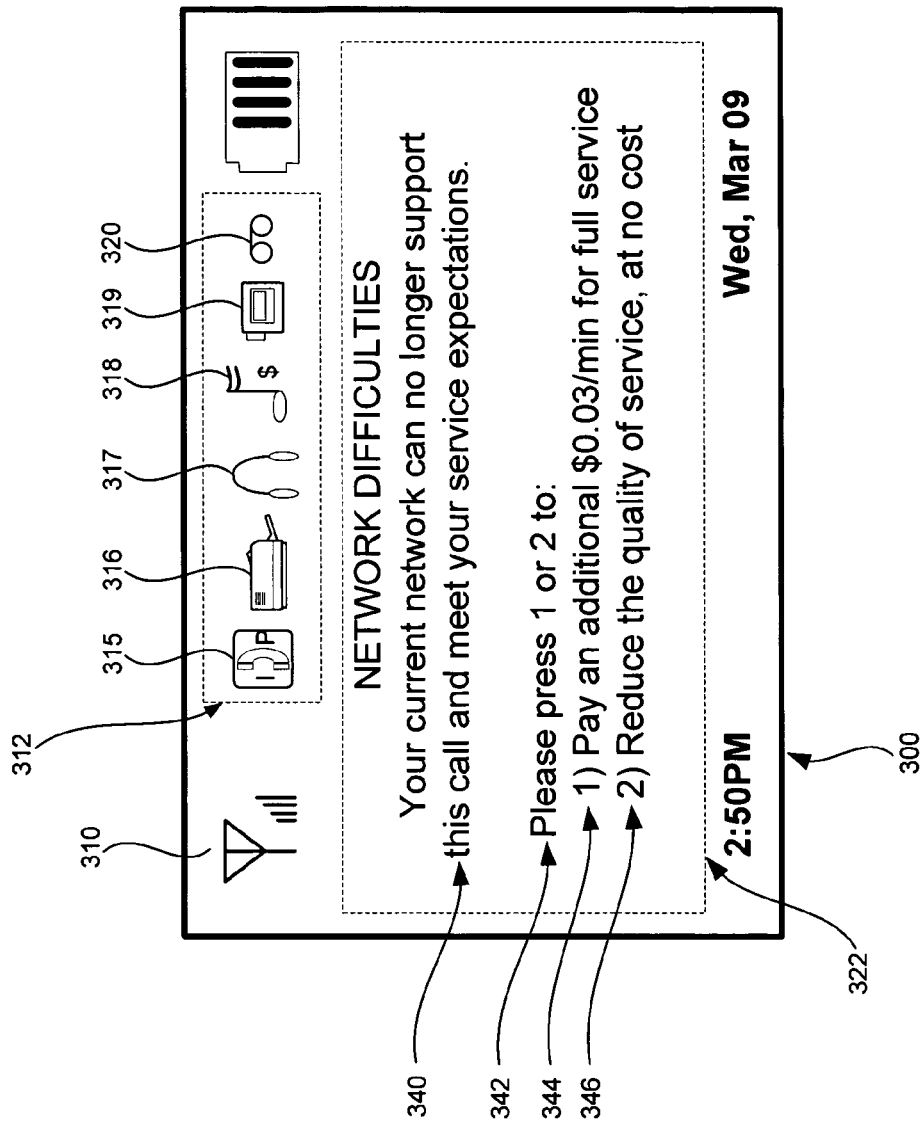
FIG. 3B shows another exemplary display of a wireless access device that may correspond to, for example, the wireless access device of FIG. 2 upon encountering wireless network impairments in which a user is prompted to choose a remedy, in accordance with a representative embodiment of the present invention.

FIG. 3B shows another exemplary display 300 of a wireless access device that may correspond to, for example, the wireless access device 226 of FIG. 2 upon encountering wireless network impairments in which a user is prompted to choose a remedy, in accordance with a representative embodiment of the present invention. The display 300 of FIG. 3B comprises a network indicator 310, a network services indicator area 312, a battery life indicator, a time of day indicator, and a day and date indicator. In addition, in the example of FIG. 3B, the network services indicator area 312 has been updated to comprise an Internet protocol (IP) phone service icon 315, a printer service icon 316, a stereo entertainment icon 317, a pay music service icon 318, a video entertainment icon 319, and a storage service icon 320 showing those services advertised by the wireless broadband access gateway as being available. The display 300 also comprises a display area 322 to allow an access device to present graphical or textual information for a variety of reasons and from a number of sources. The display area 322 shown in the illustration of FIG. 3B displays information 340 indicating that the current network serving the call is unable to support the QoS desired by the user. As previously described, this may be caused by a number of factors including, for example, wireless network load, received signal strength, signal to noise ratio, or error rate. In the illustration of FIG. 3B, the display area 322 also comprises a prompt 342 offering options the user may select to remedy impact that network conditions may have upon the multimedia information exchange. In this example, the user is informed that option 1 344 may be selected to purchase additional capacity for $0.03 per minute, and that option 2 346 may be selected to reduce the quality of the multimedia exchange and avoid additional cost. The conditions under which a user is prompted may be determined by, for example, parameters, guidelines, rules, and/or limits stored in a user profile such as the user profiles 219, 225, 235 shown in FIG. 2. Although the example of FIG. 3B shows a particular arrangement of text, other forms of user interface may be employed without departing from the spirit and scope of the present invention. When conditions improve, or additional bandwidth becomes available, a representative embodiment of the present invention may resume the exchange of multimedia information at a higher QoS by including previously stripped or restricted content.

Figure 4:
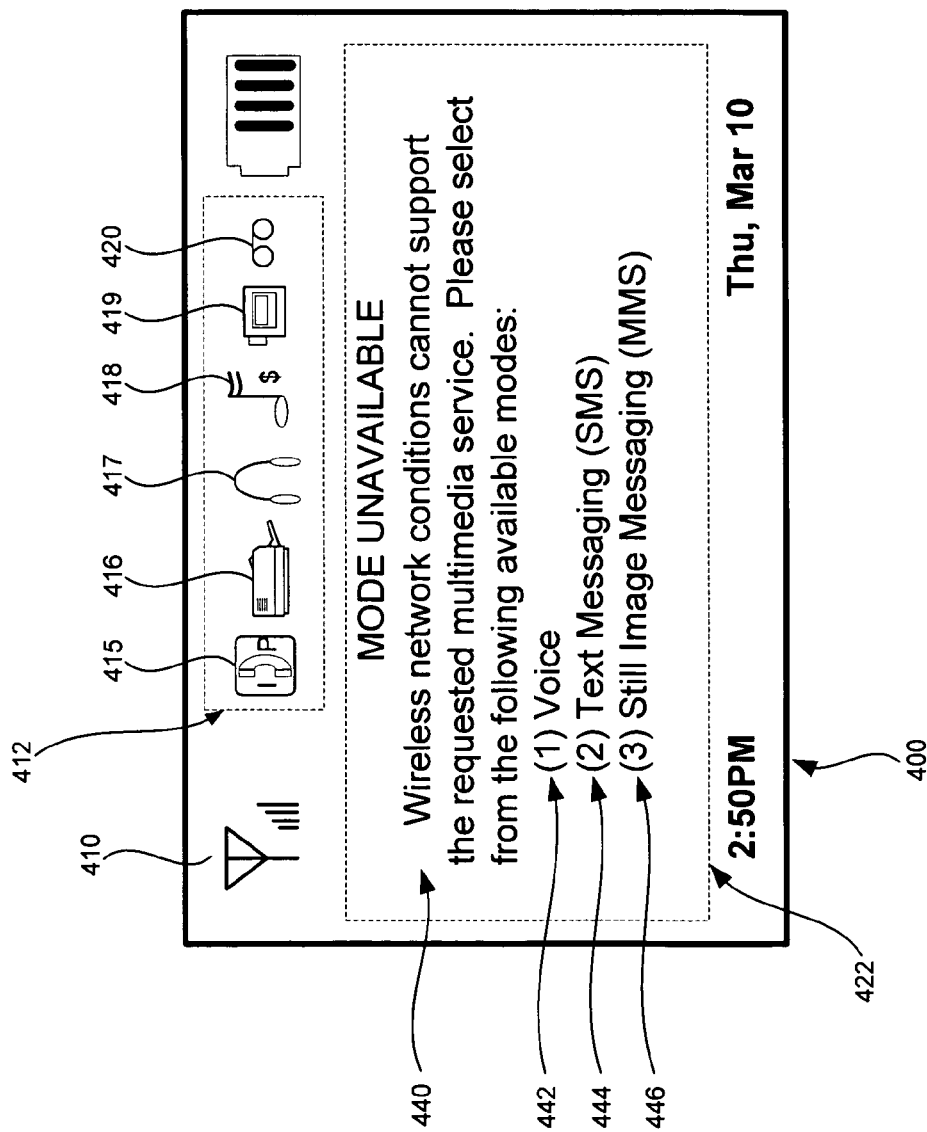
FIG. 4 shows an exemplary display of a wireless access device that may correspond to, for example, the wireless access device of FIG. 2 following a user attempt to engage in a multimedia exchange while in a service area subject to wireless network impairments, in accordance with a representative embodiment of the present invention.

FIG. 4 shows an exemplary display 400 of a wireless access device that may correspond to, for example, the wireless access device 226 of FIG. 2 following a user attempt to engage in a multimedia exchange while in a service area subject to wireless network impairments, in accordance with a representative embodiment of the present invention. The display 400 of FIG. 4 comprises a network indicator 410, a network services indicator area 412, a battery life indicator, a time of day indicator, and a day and date indicator. In addition, in the example of FIG. 4, the network services indicator area 412 has been updated to comprise an Internet protocol (IP) phone service icon 415, a printer service icon 416, a stereo entertainment icon 417, a pay music service icon 418, a video entertainment icon 419, and a storage service icon 420 showing those services advertised by the wireless broadband access gateway as being available. The display 400 also comprises a display area 422 to allow an access device to present graphical or textual information for a variety of reasons and from a number of sources. The mobile access device of the illustration of FIG. 4 has displayed information 440 indicating that the multimedia service requested by the user is currently unavailable due to network conditions, and has offered the user a voice option 442, a text messaging option 444, and a still image option 446. Restrictions in the exchange of multimedia information and service access may occur when wireless network load, receive signal strength, signal-to-noise ratio, and/or error rate, for example, precludes support in accordance with the QoS defined by the user. Parameters, guidelines, rules, and/or limits defined by the user and stored in a user profile such as the user profiles 219, 225, 235 of FIG. 2, for example, may be applied to determine the types of wireless network that are made available under specific wireless network conditions.

Figure 5A:
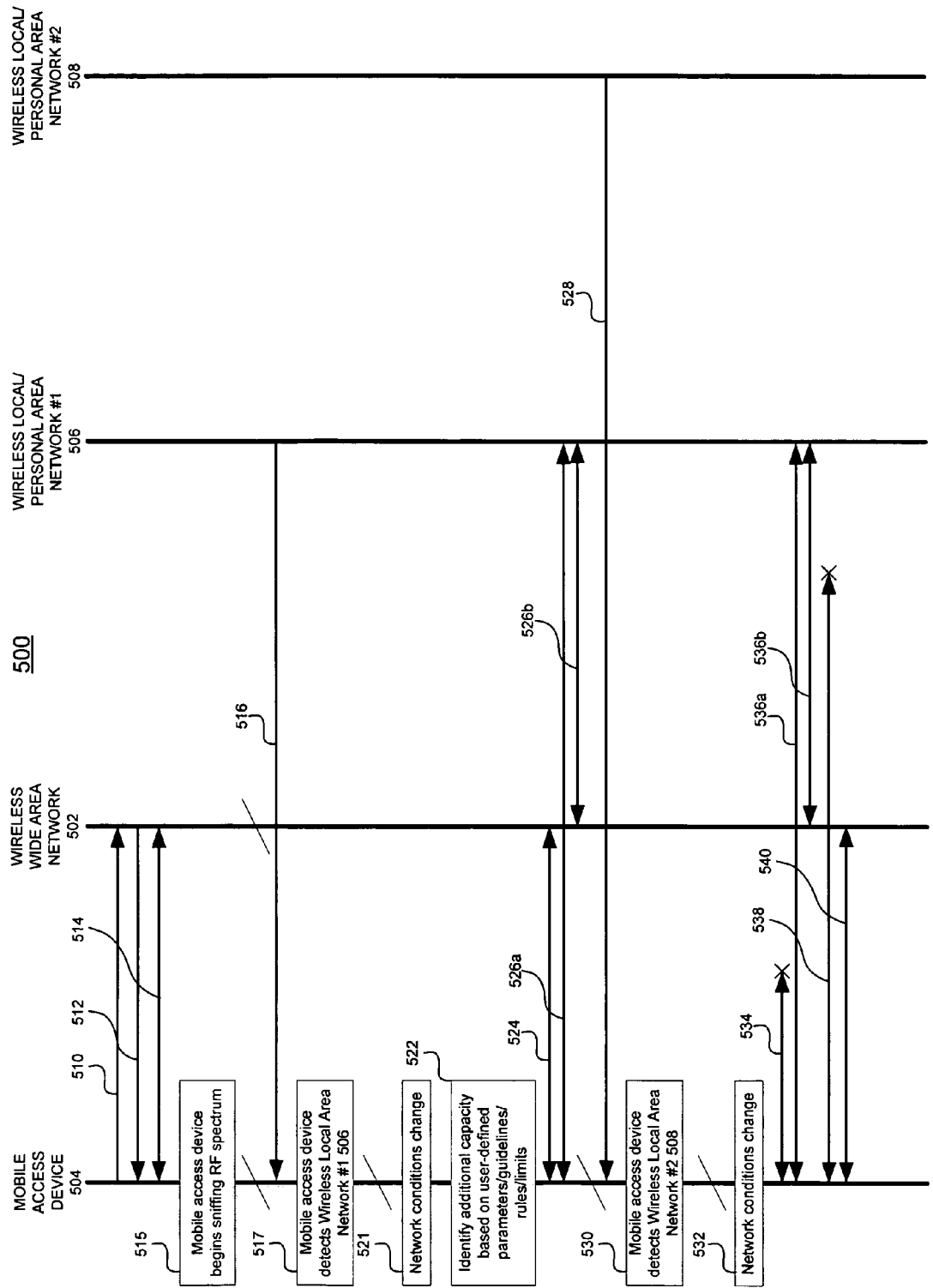
FIGS. 5A and 5B show message exchange diagrams that illustrate the use of background network scanning in the association of a mobile access device that may correspond to the mobile access device of FIG. 2 with wireless networks during the establishment and progression through an exemplary multimedia information exchange, in accordance with a representative embodiment of the present invention.
Figure 5B:
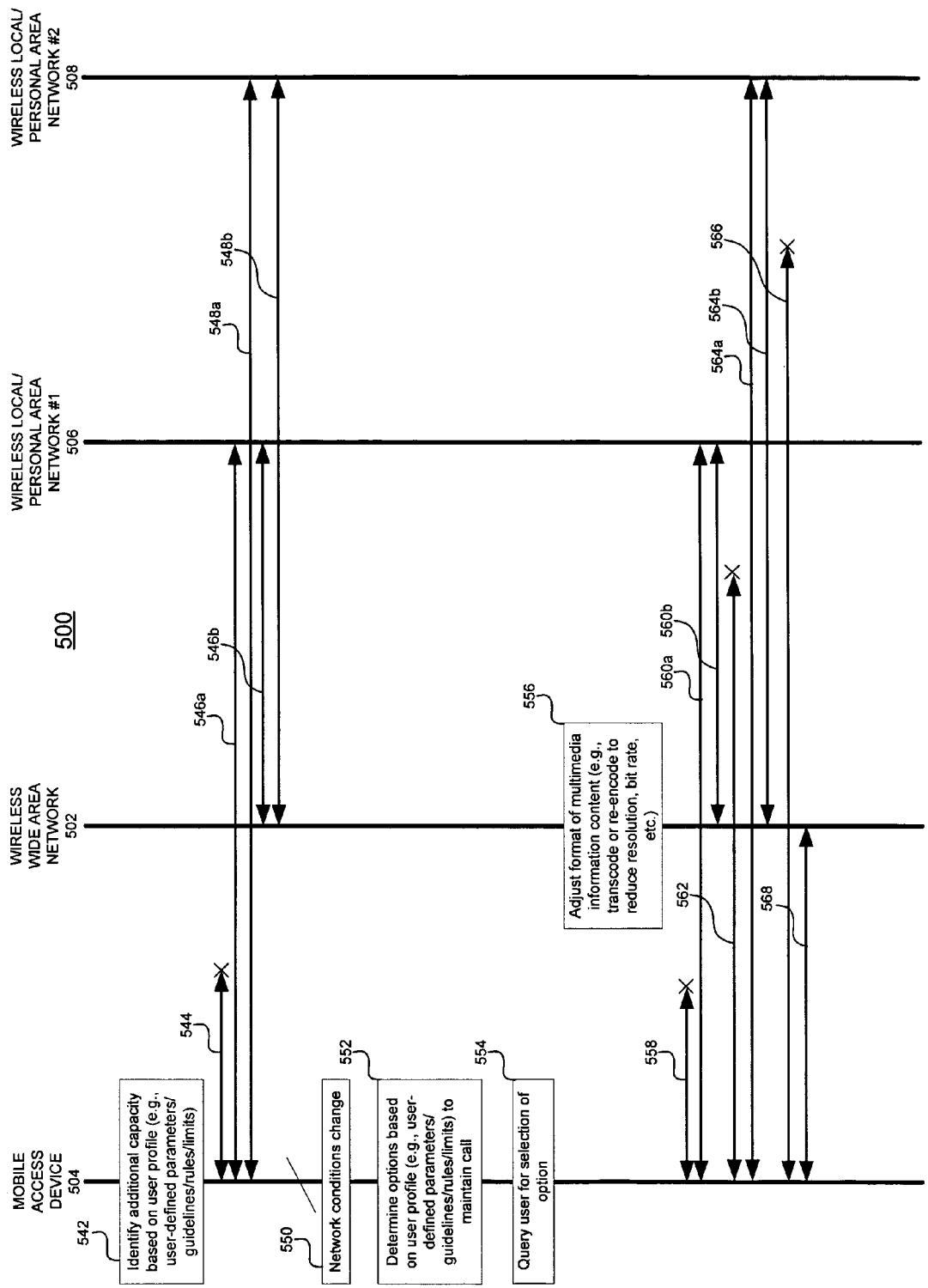

FIGS. 5A and 5B show message exchange diagrams that illustrate the use of background network scanning in the association of a mobile access device that may correspond to the mobile access device 226 of FIG. 2 with wireless networks during the establishment and progression through an exemplary multimedia information exchange, in accordance with a representative embodiment of the present invention. In the illustration of FIGS. 5A and 5B, the four vertical lines represent a wireless wide area network 502, a mobile access device 504, a wireless local/personal area network #1 506, and a wireless local/personal area network #2 508 that may correspond to, for example, the GSM/EDGE/GPRS network 214, the mobile access device 226, and the wireless network supported by the broadband access gateway 218 with wireless interface 220, and the access point 207, respectively, of FIG. 2. The horizontal lines of FIGS. 5A and 5B represent message traffic or groups of messages exchanged between a source and a destination, the destination being indicated by the arrow head. The vertical dimension represents time, advancing downward on the message exchange diagrams 500.

In a representative embodiment of the present invention, the mobile access device 504 may initiate an exchange of multimedia information via the wireless wide area network 502 using messaging 510, 512 with any of several network entities including, for example, another mobile access device served by the wireless wide area network 502, or a party accessible via the transport network 232 of FIG. 2 such as, for example, the content provider 210. Although this example describes the initiation of an exchange by the mobile access device 504, a similar sequence of events within the spirit and scope of the present invention may be applied to exchanges involving the mobile access device 504 that are initiated by other than the mobile access device 504. The messaging 510, 512 may comprise multiple messages for establishing communication between the mobile access device 504 and the wireless wide area network 502. In the illustration of FIG. 5A, the wireless wide area network 502 may activate path 514 and may use the path 514 to transport multimedia information between the wireless wide area network 502 and the mobile access device 504. The mobile access device 504 may then enable background network scanning functionality 515, to detect the presence of compatible wireless networks, and to determine wireless performance prediction parameters for the currently active and detected wireless networks. In a representative embodiment of the present invention, scanning may comprise sniffing of radio frequency spectrum.

At a later time in the information exchange, the mobile access device 504 may migrate to within the coverage area of a wireless service provider such as, for example, the wireless local/personal area network #1 506 that may correspond to, for example, the broadband access gateway 218 with wireless interface 220, of FIG. 2. At some later time, the background network scanning functionality 517 of the mobile access device 504 may detect the presence of signals 516 from the wireless local/personal area network #1 506, may analyze the received signals, and may determine that the wireless local/personal area network #1 506 may be employed with the mobile access device 504 during multimedia exchanges. This determination may be performed entirely within the mobile access device 504, or it may involve interaction with other network entities such as, for example, the wireless carrier central office 214b, the central control and management function 248, or entities accessible via the transport network 232, for example. At this point in the communication session, the service received via the wireless wide area network 502 may satisfactorily support the exchange of multimedia at the QoS desired by the user, as indicated in a user profile such as the user profiles 219, 225, 235 of FIG. 2, for example.

Later, the network conditions of wireless wide area network 502 may change 521 due to impairments such as, for example, interference, reduced signal strength, network loading, and/or other causes. This may prompt the evaluation 522 of the available wireless networks for the communication of the multimedia information. In one representative embodiment of the present invention, the mobile access device 504 may identify network capacity in addition to that provided by the wireless wide area network 502, using information about the wireless networks detected by the background network scanning functionality 517 of the mobile access device 504, and a user profile comprising, for example, parameters, guidelines, rules, and/or limits related to the QoS desired by the user. In one representative embodiment of the present invention, the evaluation may result in the automatic selection of the wireless local/personal area network #1 506 to add sufficient capacity to completely support the desired multimedia exchange. The mobile access device may then begin exchanging multimedia information via both the wireless wide area network 502 and the wireless local/personal area network #1 506 using, for example, messaging 524, 526a, 526b.

The user communication session may continue for some time, and the user may migrate within the coverage area of the wireless local/personal area network #2 508. The background network scanning functionality 530 of the mobile access device may detect the signals 528 of the wireless local/personal area network #2 508, may analyze the received signals, and may determine that the wireless local/personal area network #2 508 may also be employed with the mobile access device 504 during the exchange of multimedia information. The wireless network service provided by wireless wide area network 502 and the wireless local/personal area network #1 506 may then change 532 as the user moves or other sources of impairment become apparent, and may degrade to the point where none of the communication paths is reliable enough, as shown by messaging 534, 536a, 536b, 538, 540. Failures of messaging are shown in FIG. 5A by an "X" terminating a message path. At some point, the aggregate capacity of the wireless wide area network 502 and the wireless local/personal area network #1 506 may no longer be sufficient to support the desired multimedia information exchange. This may again prompt the evaluation 542 of the wireless networks available for the communication of the multimedia information, as described above, and the recently sniffed wireless local/personal area network #2 508 may be added to the set of communication paths, shown by messaging 544, 546a, 546b, 548a, 548b. In this example, three wireless network paths are now in use to support the multimedia exchange. A representative embodiment of the present invention, however, is not limited in respect, as a greater number of communication paths may be employed.

Continuing with respect to the illustration of FIG. 5B, network conditions may continue to change 550 and may degrade such that the exchange of multimedia information at the desired QoS can no longer be supported. In one representative embodiment in accordance with the present invention, the mobile access device may determine the options available 552 to maintain the multimedia exchange, within the conditions defined by user defined parameters, guidelines, rules, and/or limits contained in a user profile, as described above. Because no additional wireless network capacity has been detected by the background network scanning functionality 530 of the mobile access device 226, the mobile access device 504 may determine that a reduction in the QoS is an option. In a representative embodiment of the present invention such as that shown in FIG. 5B, the user may be prompted with a query 554 providing options that may be selected. For example, in order to maintain communication, the user may agree to reductions in image spatial resolution, color depth, a frame rate, audio quality (e.g., bits per sample, samples per second, number of audio channels, type of compression used), or to strip unsupportable components of a multimedia stream. In one representative embodiment of the present invention, a network entity such as, for example, the wireless carrier central office 214b of FIG. 2 may begin adjusting 556 the format of the multimedia information content, performing operations such as, for example, transcoding, changing compression algorithms, and/or reducing spatial and/or color resolution, frame rates, and/or number of bits per pixel or audio sample. The resulting multimedia stream may, after such format adjustment 556 comprise only voice, text, or simple still image graphics, for example. The resulting reduced-bandwidth information stream may be exchanged via the now, much degraded wireless network paths described above, using messaging 558, 560a, 560b, 562, 564a, 564b, 566, 568. By adding wireless network capacity, bouncing between impaired networks, or reducing the quality of service level to be provided to the user, in accordance with user-defined parameters, rules, guidelines, and/or limits, a representative embodiment of the present invention is able to maintain communication at some level, where conventional communication arrangements may simply end the call.

In some representative embodiments of the present invention, the selection of action to maintain the multimedia communication session may be performed automatically, without involving the user. The selection of the most suitable option may be based upon a profile of user defined parameters, rules, guidelines, and/or limits that are relevant to maintaining a particular minimum quality of service (QoS) level desired by the user. The user profile may include one or more of such items as cost of bandwidth in bits-per-second, cost per minute/packet/bytes exchanged, spatial resolution of images or video, color depth, frame rates, audio channels and perceived quality, network delay, information security, compression algorithms used, etc., to name only a few items.

In other representative embodiments in accordance with the present invention, the selection of the action taken to maintain multimedia communications session may involve user notification of the user of possible options, and evaluation and selection of one of the indicated options. Involvement of the user in the communication options may be employed when, for example, a particular set of network conditions lies outside of the conditions addressed by the parameters, guidelines, rules, and/or limits defined in a user profile. In other cases, prompting of the user may be performed when network conditions are within those in which the user wishes to be involved.

Figure 6:
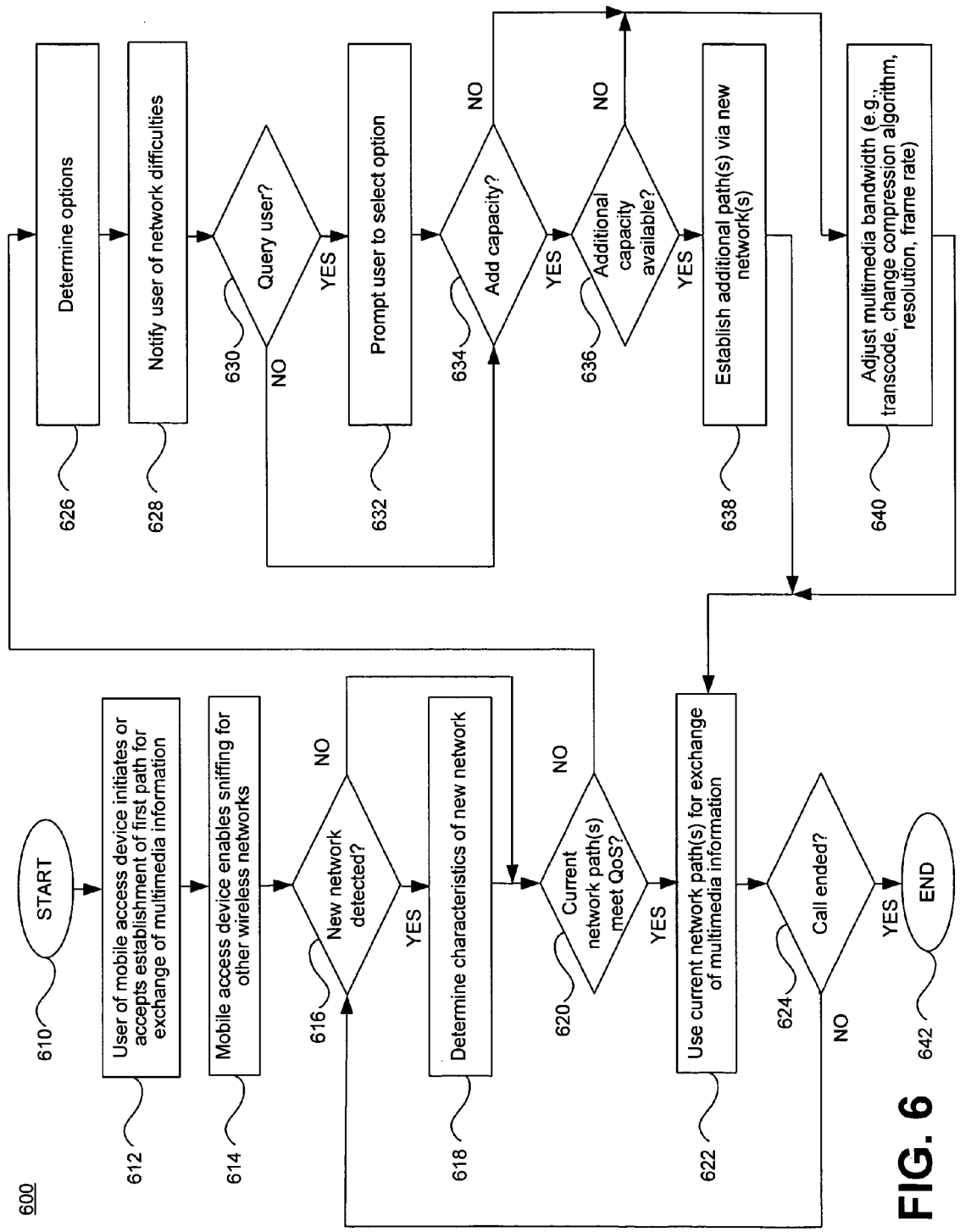
FIG. 6 is a flowchart illustrating an exemplary method of supporting association of a mobile access device such as, for example, the mobile access device of FIG. 2 using background network scanning, in accordance with a representative embodiment of the present invention.

FIG. 6 is a flowchart illustrating an exemplary method of supporting association of a mobile access device such as, for example, the mobile access device 224 of FIG. 2 using background network scanning, in accordance with a representative embodiment of the present invention. As an aid to understanding the method of FIG. 6, the following description makes reference to elements of FIG. 2. The method of FIG. 6 begins with a mobile access device such as, for example, the mobile access device 224 in an idle state (block 610). At some point, the user of the mobile access device 224 elects to initiate or accept the establishment of a communication path or channel for the exchange of multimedia information (block 612). This may result from the placing or acceptance of a call involving multimedia information, or an attempt to access a source of multimedia information via, for example, a wireless wide area network such as the GSM/EDGE/GPRS network 214 of FIG. 2. The flowchart of FIG. 6 shows that following establishment of the communication path, the mobile access device 224 may commence scanning portions of the radio frequency spectrum with which it is compatible (block 614), to determine whether other networks may be available. Another representative embodiment of the present invention may begin scanning immediately after power-up, to enable the mobile access device to have ongoing knowledge of all available wireless network resources should network communication be desired.

Next, a determination is made whether a new network has been detected (block 616). If a new network has been detected, characteristics of the network such as, for example, the frequency of operation, protocol in use, protocol operating parameters, and other information are determined (block 618). This may involve analysis by the mobile handset 224 of the received wireless network signals, and may employ network resources such as, for example, the wireless carrier central office 214b, the central control and management function 248, or other network-based entities accessible via the transport network 210, to determine the nature and secure authorization for access to the detected wireless network. If no new wireless network is detected, or after the characteristics of a newly detected network are determined, a determination may be made whether the wireless network paths currently available to the mobile access device 244 are sufficient to meet the quality of service (QoS) desired the user (block 620). If the wireless network paths currently available to the mobile access device 244 are sufficient to meet the desired QoS (block 620), the method of FIG. 6 uses the currently available wireless networks for any exchange of multimedia information (block 622). A check is then made whether call communication has ended (block 624), and is so, the method of FIG. 6 ends (block 642). If the call has not ended, the method loops back to check whether a new wireless network resource has been detected (block 616).

If the mobile access device determines that the currently available wireless networks are not meeting the desired QoS (block 620), the mobile access device may determine what options are available (block 626). This may involve accessing a user profile on the mobile access device 224 such as user profile 225, for example, or in an accessible network entity such as the user profiles 219, 235 shown in FIG. 2. In the representative embodiment of the present invention of FIG. 6, the user may be notified of the network difficulties (block 628), and a determination (e.g., based on a user profile) may be made whether the user is to be queried for input on selection of an option (block 630). The determination may use, for example, information in a user profile or service provider option. If a user prompt is indicated, the user of the mobile access device 224 is prompted (block 632). If no user prompt is to be performed, or after the user responds with a selection if a prompt was performed, the method of FIG. 6 determines whether additional wireless network capacity is to be added to the set of current network paths used for call communication (block 634). If additional network capacity is not permitted, the method shown in FIG. 6 may attempt to remedy the decline in QoS by adjusting mobile access device operation to maximize QoS and maintain the call communication by adjusting the bandwidth needed to support the call (block 640). This may include transcoding to lower bit rates, selecting an alternate protocol and/or compression algorithm, reducing a frame rate and/or a spatial or color resolution, or completely stripping some multimedia components from the call communication, for example.

If the addition of further wireless network capacity is permitted, a determination is made as to whether there is additional wireless network capacity available (block 636). If no additional capacity is available, the method may attempt to remedy the decline in QoS by adjusting mobile access device operation to maximize QoS and maintain the call communication by adjusting the bandwidth needed to support the call (block 640), as described above. If additional capacity is available, the mobile access device 224 may establish or use additional path(s) for the exchange of multimedia information (block 638), employing those network paths detected by the background network scanning functionality described above. Adding capacity may include, for example, adding new wireless networks to the paths used for communication, and authorizing payment for additional costs for additional capacity on wireless networks that may already be part of the call communication. Once the additional capacity has been made available, the method begins using the currently available set of paths for call communication.

In various representative embodiments of the present invention, use of the current wireless network path(s) for the exchange of multimedia information may include, for example, simulcasting of the information over two or more wireless network paths. For example, if several wireless network paths are available, but none has sufficient capacity to carry the entire multimedia information stream reliably, the stream may be simulcast over all available wireless network paths, and reassembled into a single stream at the receiver. This may be accomplished using, for example, sequence numbering of packets or time stamp information. When a number of wireless networks are in available at no or low cost, simulcasting may be used over disparate networks to improve reliability and capacity at little cost to the user.

In a representative embodiment of the present invention, the wireless networks used for the communication of multimedia information may, for example, employ different portions of the RF spectrum, and use different air interfaces and different communications protocols.

In some representative embodiments of the present invention, communication of multimedia information may bounce among a number of wireless networks, as the condition of each of the wireless networks improves and degrades. For example, if a number of wireless networks are in use, and each the user incurs charges for according to amount of information sent or passed via the wireless network, it may be more cost effective if the communication of multimedia information bounces between wireless networks as conditions change. This may be especially useful when wireless network conditions are changing, but sufficient periods of satisfactory wireless network performance occur over a number of wireless networks having the aggregate throughput needed to support the desired quality of service.

In a representative embodiment of the present invention, when wireless network capacity has been exhausted, or user preferences restrict the addition of capacity to a call, the multimedia information being exchanged may be modified to reduce the bandwidth needed. For example, changes in protocol used for communicating audio, still images, video, etc., may be made to reduce the amount of data exchanged to within the capacity of the available wireless communication paths. A mobile access device, and network entities such as, for example, a wireless carrier central office, a broadband access gateway, an access point, or other network entities may adapt or adjust the information being exchanged, by reducing spatial or color resolution, the number of frames or samples per unit time, the number of bits per pixel or sample, the number of channels of audio, video, or data, for example. This may also include the stripping, elimination, or redirection of some components of a multimedia stream, in order to allow the call to be maintained in a manner that conforms with the desires of the user.

Aspects of the present invention may be found in a method supporting quality of service based association of a mobile access device with a new wireless communication network using background network scanning. Such a method may comprise establishing communication via a first wireless network, detecting at least a second wireless network by scanning radio frequency spectrum, and determining at least one characteristic of the at least a second wireless network. The method may also comprise identifying network capacity among the first wireless network and the at least a second wireless network sufficient for exchange of multimedia information, and exchanging multimedia information using identified network capacity. In addition, the method may comprise detecting insufficient capacity for exchange of the multimedia information, and adjusting communication of multimedia information according to at least one user-defined quality of service parameter.

In a representative embodiment of the present invention, the first and the at least a second wireless network may comprise one of: a wireless wide area network, a wireless local area network, and a personal area network, and the wireless local area network may comprise one of: an Institute of Electrical and Electronics Engineers (IEEE) 802.11 protocol and an IEEE 802.15.3a protocol. The at least one characteristic may comprise one of: a radio frequency, an air interface protocol, a bandwidth, and a parameter used for network access. The air interface protocol may comprise one of: a time division multiple access (TDMA) protocol and a code division multiple access (CDMA) protocol, and multimedia information may comprise one of: streaming video, broadcast video, voice, digital data, text, digitized audio, digitized still images, digitized video, and digitized music.

In a representative embodiment of the present invention, adjusting communication of multimedia information may comprise identifying additional network capacity for communication of the multimedia information, from the at least a second wireless network. The additional network capacity may be on a wireless network different from those previously identified. Adjusting communication of multimedia information may comprise one of: changing a protocol used to represent the multimedia information, transcoding the multimedia information, and changing a resolution of the multimedia information, and exchanging multimedia information may comprise concurrently exchanging the multimedia information using the first wireless network and the at least one second wireless network. Exchanging multimedia information may comprise individually exchanging portions of the multimedia information using each of the first wireless network and the at least a second wireless network. The first wireless network and the at least a second wireless network may employ different air interface protocols, and scanning may comprise sniffing of radio frequency spectrum.

Other aspects of the present invention may be seen in a mobile access device supporting exchange of multimedia information employing quality of service based association with a new network using background network scanning. A representative embodiment of the present invention may comprise at least one wireless interface capable of exchanging multimedia information with a first wireless network while scanning radio frequency spectrum to detect at least a second wireless network. The first wireless network may support a first network capacity for exchange of multimedia information and the at least a second wireless network may support at least a second network capacity for exchange of multimedia information. A representative embodiment of the present invention may also comprise storage comprising at least one user-defined criteria employed in selecting wireless networks for exchange of multimedia information. The device may also comprise software resident in memory of the device, the software executable for determining at least one characteristic of the at least a second wireless network, and for identifying network capacity among the first wireless network and the at least a second wireless network sufficient for exchange of multimedia information. The device may be capable of adjusting communication of multimedia information based upon the at least one user-defined criteria and the identified network capacity.

In a representative embodiment of the present invention, the first and the at least a second wireless network comprise one of: a wireless wide area network, a wireless local area network, and a personal area network, where the wireless local area network may comprise one of: an Institute of Electrical and Electronics Engineers (IEEE) 802.11 protocol and an IEEE 802.15.3a protocol. The at least one characteristic may comprise one of: a radio frequency, an air interface protocol, a bandwidth, and a parameter used for network access, and the air interface protocol may comprise one of: a time division multiple access (TDMA) protocol and a code division multiple access (CDMA) protocol. Multimedia information may comprise one of: streaming video, broadcast video, voice, digital data, text, digitized audio, digitized still images, digitized video, and digitized music.

In a representative embodiment of the present invention, adjusting communication of multimedia information may comprise identifying additional network capacity for communication of the multimedia information, from the at least a second wireless network. The additional network capacity may be on a wireless network different from those previously identified. Adjusting communication of multimedia information may comprise one of: changing a protocol used to represent the multimedia information, transcoding the multimedia information, and changing a resolution of the multimedia information. Exchanging multimedia information may comprise concurrently exchanging the multimedia information using the first wireless network and the at least one second wireless network, exchanging multimedia information may comprise individually exchanging portions of the multimedia information using each of the first wireless network and the at least a second wireless network. The first wireless network and the at least a second wireless network may employ different air interface protocols, and scanning may comprise sniffing of radio frequency spectrum.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5-gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineers (IEEE) 802.15.3a compliant wireless networks. Such personal area networks may operate in unlicensed radio frequency spectrum such as, for example, the 2.4 and 5-gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are considerations because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

In a representative embodiment of the present invention, an access device such as, for example, a mobile multimedia handset engaged in a call served by a wireless wide area network may migrate to within the coverage area of an associated broadband access gateway with a wireless interface. The wireless wide area network may simulcast call content to the broadband access gateway via a broadband network. A user in the proximity of the broadband access gateway may be notified of the simulcasting of the call, and may elect to continue the call via a cordless phone or other access device that is compatible with the wired and/or wireless interfaces of the broadband access gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method supporting quality of service based association with a new wireless communication network using background network scanning, the method comprising:
  establishing communication via a first wireless network;
  detecting a radio frequency signal of at least a second wireless network;
  determining at least one characteristic of the at least a second wireless network;
  identifying a network capacity among the first wireless network and the at least a second wireless network such that an aggregate network capacity of the first wireless network and the second wireless network is sufficient to support an exchange of multimedia information;

communicating the multimedia information using the aggregate network capacity; and upon detecting insufficient network capacity for the exchange of the multimedia information, adjusting communication of multimedia information according to at least one user-defined quality of service parameter.

2. The method according to claim 1 wherein the first and the at least a second wireless network comprise one of: a wireless wide area network, a wireless local area network, or a personal area network.

3. The method according to claim 2 wherein the wireless local area network comprises one of: an Institute of Electrical and Electronics Engineers (IEEE) 802.11 protocol or an IEEE 802.15.3a protocol.

4. The method according to claim 1 wherein the at least one characteristic comprises one of: a radio frequency, an air interface protocol, a bandwidth, or a parameter used for network access.

5. The method according to claim 4 wherein the air interface protocol comprises one of: a time division multiple access (TOMA) protocol or a code division multiple access (COMA) protocol.

6. The method according to claim 1 wherein multimedia information comprises one of: streaming video, broadcast video, voice, digital data, text, digitized audio, digitized still images, digitized video, or digitized music.

7. The method according to claim 1 wherein adjusting communication of multimedia information comprises identifying additional network capacity for the exchange of the multimedia information, from third wireless network.

8. The method according to claim 1 wherein the aggregate network capacity comprises additional network capacity of a third wireless network.

9. The method according to claim 1 wherein the adjusting communication of multimedia information comprises one of: changing a protocol used to represent the multimedia information, transcoding the multimedia information, or changing a resolution of the multimedia information.

10. The method according to claim 1 wherein communicating multimedia information comprises concurrently communicating the multimedia information using the first wireless network and the at least one second wireless network.

11. The method according to claim 1 wherein communicating multimedia information comprises individually communicating portions of the multimedia information using each of the first wireless network and the at least a second wireless network and reassembling the multimedia information at a receiver.

12. The method according to claim 1 wherein the first wireless network and the at least a second wireless network employ different air interface protocols.

13. The method according to claim 1 wherein communicating multimedia information comprises simulcasting the multimedia information using each of the first wireless network and the at least a second wireless network and reassembling the multimedia information at a receiver.

14. A mobile access device supporting quality of service based association with a new network using background network scanning, the device comprising:

at least one wireless interface capable of communicating multimedia information with a first wireless network while scanning radio frequency spectrum to detect a radio frequency signal of at least a second wireless network, wherein the first wireless network supports a first network capacity for communication of multimedia information and the at least a second wireless network supports at least a second network capacity for communication of multimedia information;

storage comprising at least one user-defined criteria employed in selecting wireless networks for communication of multimedia information;

software resident in memory of the device, the software executable for determining at least one characteristic of the at least a second wireless network, and for identifying network capacity among the first wireless network and the at least a second wireless network sufficient for communication of multimedia information; and the device capable of adjusting communication of multimedia information based upon the at least one user-defined criteria and the identified network capacity, upon detecting insufficient network capacity for communication of the multimedia information.

15. The device according to claim 14 wherein the first and the at least a second wireless network comprise one of: a wireless wide area network, a wireless local area network, or a personal area network.

16. The device according to claim 15 wherein the wireless local area network comprises one of: an Institute of Electrical and Electronics Engineers (IEEE) 802.11 protocol or an IEEE 802.15.3a protocol.

17. The device according to claim 14 wherein the at least one characteristic comprises one of: a radio frequency, an air interface protocol, a bandwidth, or a parameter used for network access.

18. The device according to claim 17 wherein the air interface protocol comprises one of: a time division multiple access (TOMA) protocol or a code division multiple access (COMA) protocol.

19. The device according to claim 14 wherein adjusting communication of multimedia information comprises identifying additional network capacity for communication of the multimedia information, from the at least a second wireless network.

20. The device according to claim 19 wherein the additional network capacity is on a third wireless network.

21. The device according to claim 14 wherein communicating multimedia information comprises concurrently communicating the multimedia information using the first wireless network and the at least one second wireless network.

22. The device according to claim 14 wherein communicating multimedia information comprises individually communicating portions of the multimedia information using each of the first wireless network and the at least a second wireless network.

23. The device according to claim 14 wherein the user-defined criteria comprises reducing a quality of service parameter to limit a required network capacity for communication of the multimedia information.

24. The device according to claim 23 wherein reducing a quality of service parameter comprises decreasing a resolution of the multimedia information.

25. The device according to claim 23 wherein reducing a quality of service parameter comprises decreasing a frame rate of the multimedia information.

26. The device according to claim 23, wherein reducing the quality of service parameter is determined in response to an input queried by the device.

* * * * *